United States Patent [19]
Shoji et al.

[11] Patent Number: 5,813,508
[45] Date of Patent: Sep. 29, 1998

[54] STARTING CLUTCH

[75] Inventors: Masao Shoji, Fujisawa; Yasuhito Koike, Iwata, both of Japan

[73] Assignee: NSK-Warner K.K., Tokyo, Japan

[21] Appl. No.: 768,933

[22] Filed: Dec. 18, 1996

[30] Foreign Application Priority Data

Dec. 18, 1995 [JP] Japan ................................... 7-328931
Apr. 2, 1996 [JP] Japan ................................... 8-079962

[51] Int. Cl.$^6$ ............................. F16D 25/00; F16D 13/72
[52] U.S. Cl. .................................. 192/113.34; 192/55.61; 192/70.12; 192/85 AA
[58] Field of Search ...................... 192/70.12, 85 AA, 192/113.34, 113.36, 55.61

[56] References Cited

U.S. PATENT DOCUMENTS

| | | | |
|---|---|---|---|
| 3,063,531 | 11/1962 | Aschauer | 192/113.36 |
| 3,145,816 | 8/1964 | De Lorean et al. | 192/113.34 X |
| 3,295,647 | 1/1967 | Murphy | 192/113.34 X |
| 3,422,943 | 1/1969 | Zeidler | 192/113.34 |
| 4,679,677 | 7/1987 | Ohzono et al. | 192/85 AA |
| 4,724,942 | 2/1988 | Casse et al. | 192/113.34 X |
| 4,875,561 | 10/1989 | Schneider et al. | 192/85 AA X |
| 4,997,074 | 3/1991 | Larson et al. | 192/85 AA X |

*Primary Examiner*—Rodney H. Bonck
*Attorney, Agent, or Firm*—Shapiro and Shapiro

[57] ABSTRACT

In a starting clutch, an oil path for operating the clutch is provided independently of an oil path for cooling a frictional surface. That is, there is provided an oil path exclusively for cooling the frictional surface. Accordingly, a necessary amount of oil can be supplied to the frictional surface, which can thus be cooled efficiently.

13 Claims, 3 Drawing Sheets

STARTING CLUTCH

BACKGROUND OF THE INVENTION

1. Field of the Invention

This invention relates to a starting clutch for use in a transmission for a vehicle, and more particularly to improvements in the hydraulic circuit of the starting clutch.

2. Related Background Art

A torque converter with a lock-up clutch according to the prior art operates the lock-up clutch by the utilization of a pressure difference to thereby effect the control of fastening, liberation or slip.

FIG. 4 of the accompanying drawings is a schematic view showing an example of the torque converter with a lock-up clutch. The power transmission route of the torque converter is as follows. First, during the liberation of the lock-up clutch 10, power outputted from an engine to a drive plate, not shown, is transmitted from the drive plate to a projected portion 7 integral with a pump impeller 8 and further transmitted to an input shaft 3 via a turbine 9, whereafter the power is transmitted to a rear automatic transmission body.

During the fastening of the lock-up clutch 10, the power from the engine is transmitted to the drive plate, is transmitted from the projected portion 7 integral with a front cover 24 via the front cover to the lock-up clutch 10 fastened to the front cover, and is transmitted from the input shaft 3 to the rear automatic transmission body.

Description will now be made of the control of the lock-up clutch 10 utilizing oil paths. There are three lines of oil paths for control, and one of them is an oil path A defined by the inner peripheral surface of the sleeve 1 of the torque converter and the outer peripheral surface of a stator shaft 2, another one of them is an oil path B defined by the inner peripheral surface of the stator shaft 2 and the outer peripheral surface of the input shaft 3, and the last one is an oil path C which is a center hole formed in the input shaft 3.

The above-described lock-up clutch operates as follows. When an oil chamber at the left of a lock-up piston 25 formed with a frictional material 10a between the lock-up clutch 10 and the front cover 24 as a boundary is defined as P1 and an oil chamber at the right of the lock-up piston 25 is defined as P2, for example, during the fastening of the lock-up clutch 10, in the oil chamber P2, oil pressure supplied from the pump of the automatic transmission flows from the oil path A via the pump impeller 8 and oil flows in the order of 11→12→13→14→15→16 and moves the lock-up clutch 10 leftwardly as viewed in FIG. 4, i.e., toward the front cover 24 side. Also, in the oil chamber P1, oil flows in the order of 23→22→21→20 and is discharged from the center hole 6 of the input shaft 3. The pressure in the oil chamber P1 becomes smaller than the pressure in the oil chamber P2, and the lock-up clutch 10 is fastened to the inner surface of the front cover 24 with the frictional material 10a interposed therebetween.

The oil pressure of the pump after the fastening flows from the pump impeller 8 via a turbine runner in the order of 11→12→13→17→18→19 and is discharged from the oil path B.

Also, during the liberation of the lock-up clutch 10, oil pressure is supplied from the center hole 6 of the input shaft 3 to the oil chamber P1 (in the figure, in the direction of 20→21→22→23). At this time, the oil pressure in the oil chamber P1 becomes higher than the oil pressure in the oil chamber P2, and moves the lock-up clutch 10 rightwardly as viewed in FIG. 4, thus liberating the lock-up clutch 10. The pressure in the oil chamber P1 after the liberation passes through a gap formed by a turbine runner and the pump impeller 8, and is discharged from the oil path B (the flow in the direction of 15→14→13→17→18→19).

As is apparent from the foregoing description, the oil path A is used exclusively for the fastening of the lock-up clutch 10, the oil path B is used exclusively as the drain of the fastening pressure of the lock-up clutch 10 (the flow in the gap 14 from the oil path A) and the liberating pressure of the lock-up clutch 10 (the flow from the center hole 6 of the input shaft 3), and an oil path C from the center hole 6 of the input shaft 3 is used exclusively for the liberation of the lock-up clutch 10. Accordingly, there is no hydraulic circuit exclusively for cooling which is independent of the clutch operation.

Also, in a multi-plate type lock-up clutch in which two frictional surfaces are provided, as in a single-plate type lock-up clutch, in any of the cases of the fastening, drain and liberation of the lock-up clutch, there is no hydraulic circuit exclusively for cooling which is independent of the clutch operation.

Further, in a torque converter with a multi-plate lock-up clutch of a type having a closed oil chamber, as in a single-plate type lock-up clutch, in any of the cases of the fastening, drain and liberation of the lock-up clutch, there is no hydraulic circuit exclusively for cooling which is independent of the clutch operation.

As described above, generally the lock-up clutch performs its operation by three oil paths, but for example, there is no oil path exclusively for cooling the frictional material of the lock-up clutch. When the cooling of the frictional surface is to be done during the fastening or the slip of the lock-up clutch, the cooling flow rate cannot be adjusted unless there is taken a countermeasure such as providing in the frictional surface of the frictional material of the lock-up clutch a groove in which the oil chambers P1 and P2 are completely liberated. However, the provision of such a through-groove would pose a new problem that the fastening torque of the lock-up clutch is reduced or the lock-up clutch becomes non-fastened.

Further, the torque converter itself with a lock-up clutch cannot bring about a so-called neutral state in which structurally the transmission of power is cut off.

SUMMARY OF THE INVENTION

Accordingly, it is an object of the present invention to provide a starting clutch provided with an exclusive cooling oil path capable of cooling the frictional surface of the starting clutch without affecting the operation of the starting clutch in any way.

To achieve the above object the starting clutch of the present invention can provide a starting clutch for a transmission comprising an input shaft having a center hole extending in the axial direction thereof, a shaft member disposed radially outwardly of the input shaft, a clutch case disposed radially outwardly of the shaft member and containing a clutch portion and a clutch piston therein, and a housing containing the clutch case therein, characterized by the provision of a cooling oil path defined between the center hole of the input shaft and the clutch portion and supplying oil for cooling the frictional surface of the clutch portion, an operating oil path defined between the input shaft and the shaft member and between the clutch case and the clutch piston and supplying oil for operating the clutch portion, and a drain oil path defined between the housing and the clutch case and between the shaft member and the housing and discharging the cooling oil having cooled the frictional surface, the cooling oil path and the drain oil path being provided independently of the operating oil path.

The structure may advantageously be such that the three oil paths of a torque converter with a lock-up clutch are intactly used, whereby the torque converter can easily be replaced with the starting clutch without any basic structural change. The present invention enables a frictional surface to be cooled with cooling oil supplied from a dedicated oil path using one of the three oil paths which have previously been used in the torque converter with a lock-up clutch, the other paths being used as an oil path exclusively for drain and an oil path for clutch control.

Thus, an oil path directed to only cooling can be secured to thereby supply a necessary amount of oil to the frictional surface of the clutch when necessary, whereby efficient cooling is provided without waste and the life of the frictional plate of the starting clutch can be extended. Also, the oil path exclusively for drain is an oil path independent of the operation of the clutch and therefore, smooth drain after cooling becomes possible. The oil path for clutch control is also independent of the cooling path and the drain path and therefore, clutch control also becomes singly operable. Also, thereby, even when for example, the frictional surface has a groove extending from the inner peripheral side to the outer peripheral side of the frictional material, effective cooling of the frictional surface becomes possible without affecting clutch operation.

DESCRIPTION OF THE PREFERRED EMBODIMENTS

Figure 1:
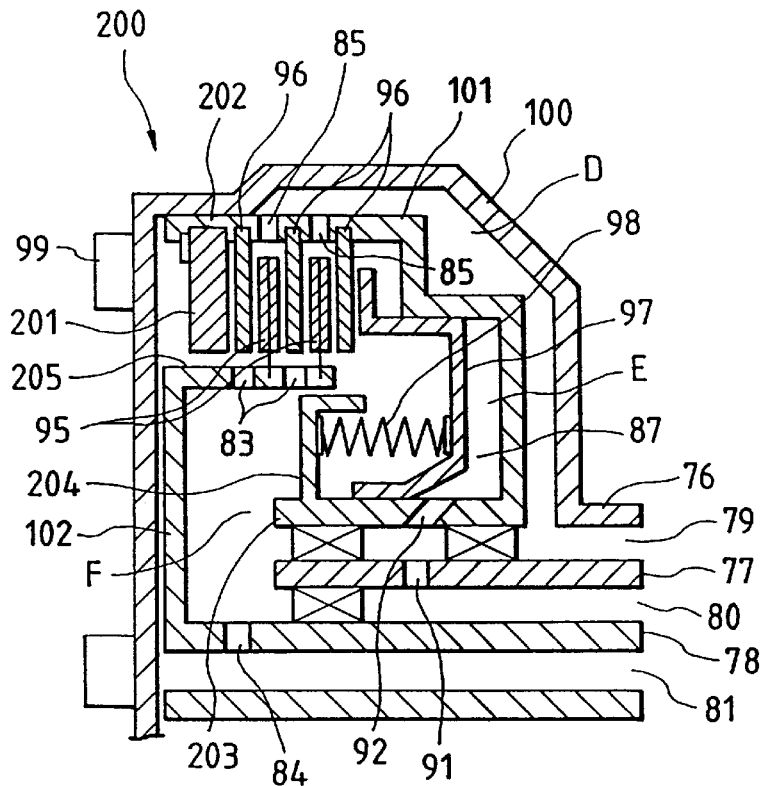
FIG. 1 is a schematic cross-sectional view of a starting clutch according to a first embodiment of the present invention.

FIG. 1 is a schematic cross-sectional view of a starting clutch according to a first embodiment of the present invention which replaces a torque converter with a lock-up clutch.

The starting clutch 200 comprises a sleeve 76, a fixed shaft 77 provided inside the sleeve 76, and an input shaft 78 provided inside the fixed shaft 77. The sleeve 76 is a portion of a housing 100, and the clutch case 101 of the starting clutch 200 is mounted in the housing 100. The clutch case 101 is rotatable with the housing 100.

A clutch piston 97 is axially slidably disposed in the clutch case 101. A plurality of plates 96 axially slidable through a spline or the like are axially provided at predetermined intervals on the outer peripheral cylindrical portion 202 of the clutch case 101. Adjacent the plates 96, a fixed plate 201 is fixed to the clutch case 101. Also, a projected portion 99 is provided on the back of the housing 100.

The inner peripheral cylindrical portion 203 of the clutch case 101 is fitted to the fixed shaft 77 through a bearing. A radially outwardly extending flange portion 204 is provided on the inner peripheral cylindrical portion 203, and a spring 98 is disposed between the flange portion 204 and the clutch piston 97. The spring 98 imparts a force in a direction to urge the clutch piston 97 against the inner surface of the clutch case 101.

The end portion of the input shaft 78 of the starting clutch 200 provides a disc-like hub 102 on the rear side of the housing 100, and a cylindrical portion 205 is provided radially outwardly of the hub 102.

The plurality of frictional plates 95 of the starting clutch 200 are axially slidably provided at axially predetermined intervals on the cylindrical portion 205 of the hub 102 through a spline or the like. In the present embodiment, design is made such that a frictional plate 95 is held between adjacent ones of three plates 96. That is, two frictional plates 95 are provided. Of course, however, the number of the plates 96 and the number of the frictional plates 95 can be arbitrarily set. Also, the frictional material attached to the frictional plates 95 can be provided on both sides or one side of the frictional plates. This also holds true in a second embodiment which will be described later.

The oil path of the starting clutch 200 will now be described. A drain oil path D for cooling oil for cooling the frictional surfaces between the frictional plates 95 and the plates 96 having a drain outlet 79 between the sleeve 76 and fixed shaft 77 of the starting clutch is formed between the fixed shaft 77 of the starting clutch 200 and the sleeve 76 of the starting clutch 200.

Likewise, an operating oil path E for operating the clutch piston 97 which communicates with the gap 80 between the fixed shaft 77 and the input shaft 78 through holes 92 and 91 is formed between the fixed shaft 77 and the input shaft 78.

Further, a cooling oil path F for cooling the frictional surfaces between the frictional plates 95 and the plates 96 through a hole 84 is formed in a center hole 81 extending in the axial direction of the input shaft 78.

There are a plurality of communication holes 85 in the outer peripheral cylindrical portion 202 of the clutch case 101, and a plurality of communication holes 83 are provided in the cylindrical portion 205 of the hub 102, and communicate the drain oil path D and the cooling oil path F with each other through the gaps between the frictional plates 95 and the plates 96. That is, the drain oil path D and the cooling oil path F together constitute an oil path exclusively for cooling the frictional surfaces.

Description will hereinafter be made of the flow in the frictional surface cooling oil path of the starting clutch of the above-described construction.

The cooling oil passes through the cooling oil path F, i.e., from the center hole 81 through the through-holes 84 and the through-hole 83 to the frictional surfaces of the starting clutch 200, and flows in a direction to lubricate, i.e., cool the frictional surfaces. This cooling oil cools the frictional surfaces between the frictional plates 95 and the plates 96, whereafter it is discharged from the drain oil path D, i.e., from the through-holes 85 to the drain outlet 79.

If grooves extending from the radially inner peripheral side to the outer peripheral side of the frictional material attached to the frictional plates 95 and extending through the frictional material are formed in the frictional material, the flow of the cooling oil will become smoother and a greater cooling effect will be obtained. While the number of the grooves can be arbitrarily set, it is preferable to form a plurality of such grooves in the circumferential direction for the smooth flow of the cooling oil.

The operating oil path for operating the clutch piston 97 of the starting clutch 200 passes from the gap 80 between the fixed shaft 77 and the input shaft 78 through the through-holes 91 and 92 toward an oil pressure chamber 87. When the starting clutch 200 is to be fastened, the oil pressure in this oil pressure chamber 87 is elevated and by the oil pressure force, the clutch piston 97 is moved leftwardly as viewed in FIG. 1. As a result, the frictional plates 95 and the plates 96 are fastened to each other between the clutch piston 97 and the fixed plate 201, and the starting clutch 200 becomes fastened and thus, power becomes transmittable. Next, if the oil pressure in the oil pressure chamber 87 is decreased, the clutch piston 97 will be moved rightwardly by the reaction force of a coil spring 98, and the frictional plates 95 and the plates 96 will be separated from each other and the starting clutch 200 will be unfastened and become non-fastened.

Description will now be made of the power transmitting route of the starting clutch 200 according to the present embodiment. During the fastening of the starting clutch, power output from an engine, not shown, is transmitted to the housing 100 through a drive plate, not shown, and the projected portion 99 of the housing 100. Next, the power is transmitted to the clutch case 101 of the starting clutch which is rotated with the housing 100, and is transmitted to the input shaft 78 of the starting clutch 200 through the plates 96 connected to the clutch case 101 through a spline or the like, the frictional plates 95 urged against the plates 96 by the piston 97, and the hub 205. The power transmitted to the input shaft 78 is transmitted to an automatic transmission body, not shown.

Next, during the liberation of the starting clutch 200, the power outputted from the engine is transmitted to the housing 100 through the drive plate and through the projected portion 99 of the housing 100. Thereafter, the power is transmitted to the clutch case 101 of the starting clutch which is rotated with the housing 100, and is transmitted to the plates 96 connected to the clutch case 101 through a spline or the like. During the liberation of the starting clutch 200, however, the connection between the plates 96 and the frictional plates 95 is cut off and therefore, there is no transmission of the power from the plates 96 to the frictional plates 95, and the starting clutch 200 assumes its neutral state.

Figure 2:
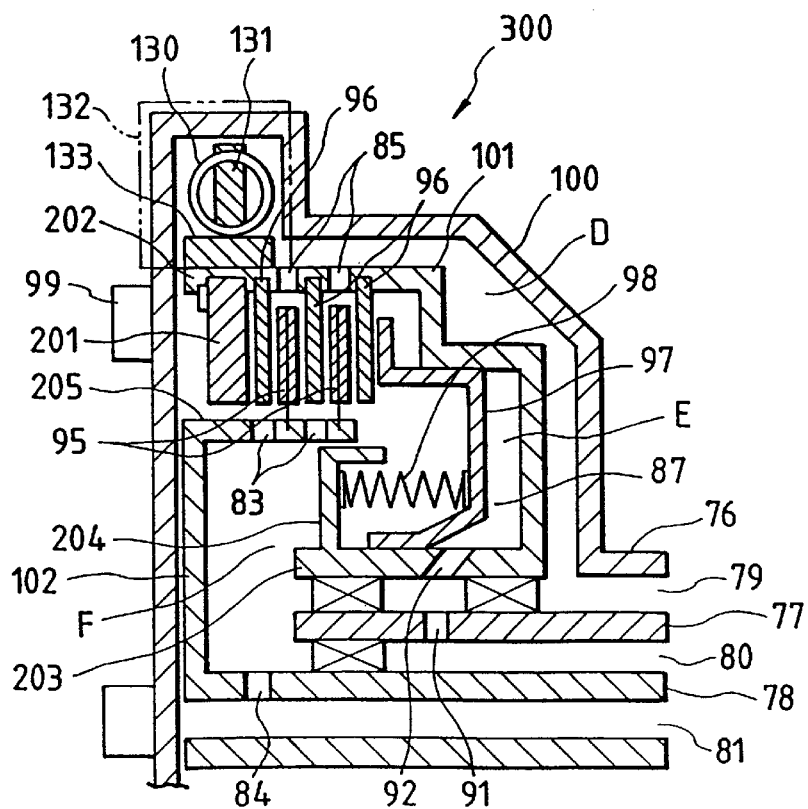
FIG. 2 is a schematic cross-sectional view of a starting clutch according to a second embodiment of the present invention.

FIG. 2 is a schematic cross-sectional view of a starting clutch 300 according to a second embodiment of the present invention.

The second embodiment is of the same construction as the aforedescribed first embodiment except the provision of a damper device 132 and therefore, the same portions need not be described.

The damper device 132 is provided at the upper position of the clutch portion of the housing 100 of the starting clutch 300. The damper device 132 comprises hub plates 131 integral with a cylindrical portion 133 connected to the outer periphery of the outer peripheral cylindrical portion 202 of the clutch case 101 by a spline or the like, and a damper spring 130 interposed between the hub plates 131.

Description will now be made of the power transmitting route of the starting clutch 300 according to the second embodiment. During the fastening of the starting clutch 300, power outputted from an engine, not shown, is transmitted to the housing 100 by the projected portion 99 formed integrally with the housing 100, through a drive plate, not shown. Next, the power is transmitted from the housing 100 to the damper spring 130, the hub plates 131 and the outer peripheral cylindrical portion 202 of the clutch case 101 connected to the hub plates 131 by a spline or the like.

Thereafter, the power transmitted to the clutch case 101 of the starting clutch which is rotated with the housing 100 is transmitted to the input shaft 78 of the starting clutch 300 through the plates 96 connected to the outer peripheral cylindrical portion 202 of the clutch case 101 through a spline or the like, the frictional plates 95 urged against the plates 96 by the piston 97, and the hub 205. The power transmitted to the input shaft 78 is transmitted to an automatic transmission body, not shown.

Next, during the liberation of the starting switch 300, the power outputted from the engine is transmitted to the housing 100 by the projected portion 99 of the housing through the drive plate. Next, the power is transmitted from the housing 100 to the damper spring 130, the hub plates 131 and the outer peripheral cylindrical portion 202 of the clutch case 101 connected to the hub plates 131 by a spline or the like.

Thereafter, the power is transmitted to the clutch case 101 of the starting clutch which is rotated with the housing 100, and is transmitted to the plates 96 connected to the clutch case 101 through a spline or the like. During the liberation of the starting clutch 300, however, the connection between the plates 96 and the frictional plates 95 is cut off and therefore, there is no transmission of the power from the plates 96 to the frictional plates 95, and the starting clutch 300 assumes its neutral state.

According to the second embodiment described above, the damper device 132 is provided and therefore, the shock during the connection and disconnection of the clutch can be absorbed and thus, the durability and life of the starting clutch are improved. Also, in spite of the provision of the damper device 132, the power transmitting route and the cooling oil path function entirely similarly to the case of the first embodiment.

In the first and second embodiments, the clutch portion comprises the frictional plates and the plates 96.

In both of the first embodiment and the second embodiment, there is provided an oil path exclusively for cooling which can independently cool the clutch frictional surfaces of the starting clutch and therefore, the operating oil path for operating the clutch piston can be independently controlled. Also, the provision of the damper device 132 does not at all affect the control of the starting clutch itself.

In the torque converter with a lock-up clutch, the power could not be cut off by the converter mechanism itself, while in the starting clutch of the present invention, during the liberation of the clutch, the neutral state in which the power is completely cut off between the frictional plates 95 and plates 96 of the starting clutch is made possible, and the clutch piston 97 of the starting clutch is hydraulically controlled, whereby power transmission, as required, of a power transmission rate of nearly 0% to 100% is made possible.

Also, the starting clutch of the present invention can be applied not only to the automatic transmission (A/T) according to the prior art, but entirely equally to other power transmitting mechanism, for example, an infinitely variable transmission such as CVT.

Figure 3A:
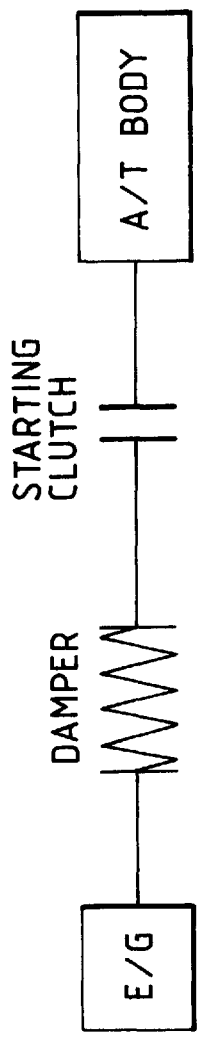
FIGS. 3A, 3B, 3C, 3D and 3E illustrate the arrangement of the starting clutch of the present invention, an engine, a damper and a transmission body.
Figure 3B:
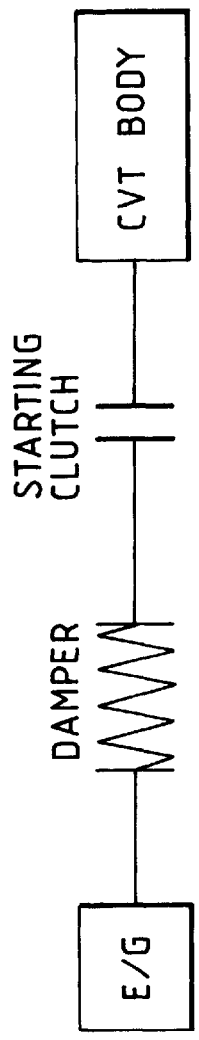
Figure 3C:
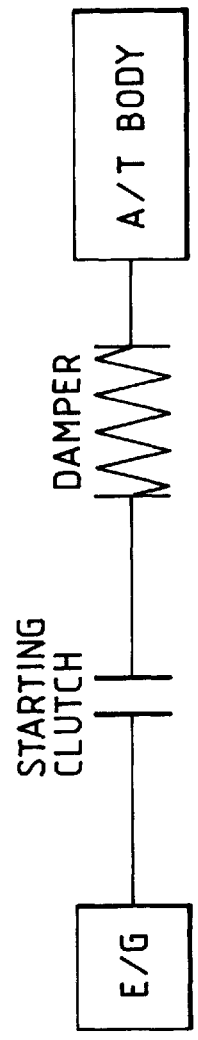
Figure 3D:
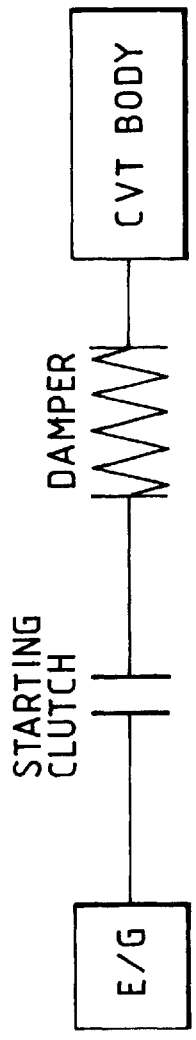
Figure 3E:
Figure 4:
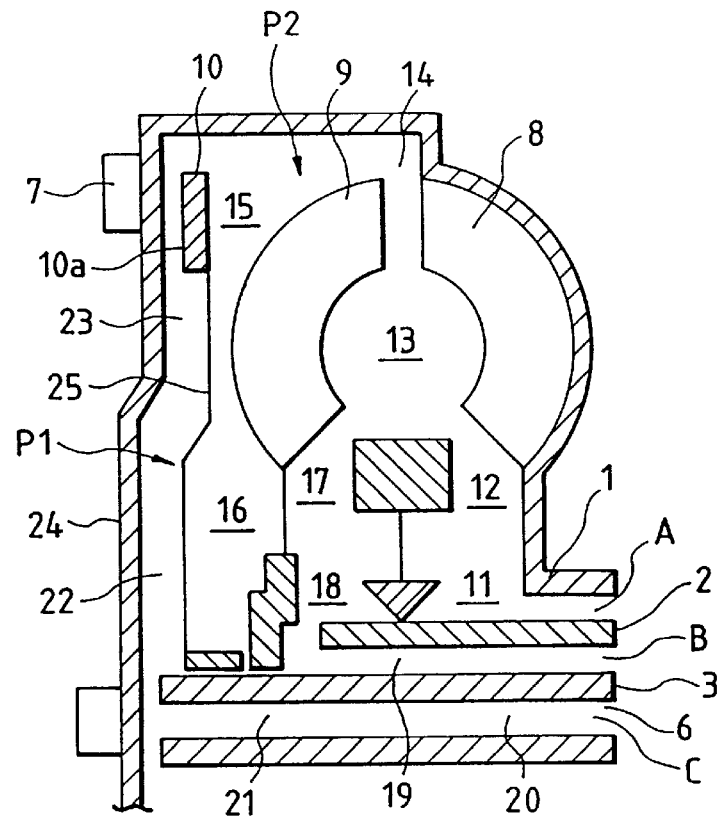
FIG. 4 is a cross-sectional view showing a torque converter with a lock-up clutch according to the prior art.

FIGS. 3A, 3B, 3C, 3D and 3E are views illustrating that the starting clutch of the present invention can be disposed at any position between an engine and a transmission body such as an automatic transmission. In FIG. 3A, the starting clutch connected to the engine (E/G) through a damper is connected to an ordinary automatic transmission (A/T)

body. In FIG. 3B, the starting clutch connected to the engine (E/G) through the damper is connected to an infinitely variable transmission (CVT) body. In FIG. 3C, conversely to FIG. 3A, the starting clutch connected to the engine is connected to the automatic transmission body through the damper. In FIG. 3D, conversely to FIG. 3B, the starting clutch connected to the engine is connected to the infinitely variable transmission body through the damper. In FIG. 3E, the starting clutch connected to the engine through the damper is connected to the automatic transmission body through another damper. Of course, in FIG. 3E, it is possible to replace the automatic transmission with the infinitely variable transmission.

Of course, the starting clutch according to the first embodiment of the present invention can be used in any of the combinations of FIGS. 3A, 3B, 3C, 3D and 3E.

Figure 5:
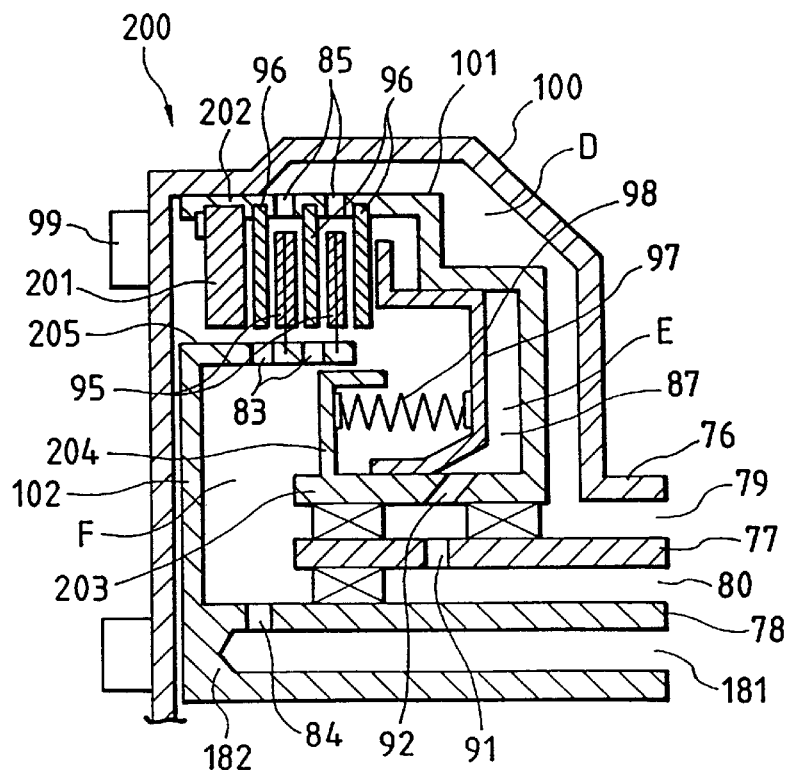
FIG. 5 is a schematic cross-sectional view of a starting clutch showing another example of the construction of the center hole of an input shaft.

FIG. 5 is a schematic cross-sectional view of a starting clutch showing another construction of the center hole of the input shaft. As is apparent from this figure, the center hole 181 is closed at an axial end 182 of the input shaft 78. Again in this case, however, the center hole 181 axially extends to a location communicating with the through-hole 84 which is a portion of the cooling oil path. Of course, the non-through-center hole shown in FIG. 5 is applicable to any of the above-described embodiments.

Since the piston operating oil path of the starting clutch and the cooling oil path for the frictional surfaces are provided independently of each other, the frictional surface cooling flow can be made to flow at a suitable time and in a suitable amount, and necessary power transmission can be freely controlled within the range of the power transmission rate of nearly 0% to 100%.

According to a starting clutch of the present invention described above, there are obtained the following effects:

(1) The provision of the oil path exclusively for cooling the frictional surfaces enables a necessary amount of oil to be supplied to the frictional surfaces of the clutch when necessary and thus, efficient cooling can be accomplished without waste and the life of the frictional plates of the starting clutch can be extended.

(2) Also, the oil path exclusively for drain which is a portion of the cooling oil path is an oil path independent of the operation of the clutch and therefore, smooth discharging of the oil after cooling becomes possible.

(3) Since the operating oil path for clutch control is such that the cooling oil path and the drain oil path are independent of each other, clutch control becomes singly operable with any power transmission efficiency. Also, thereby, the effective cooling of the frictional surfaces becomes possible without affecting the clutch operation even when, for example, the frictional surfaces have grooves extending from the inner peripheral side to the outer peripheral side of the frictional material.

(4) It becomes possible to intactly use the forms of the three oil paths of a torque converter with a lock-up clutch, and easily replace the torque converter with the starting clutch of the present invention without any basic structural change.

What is claimed is:

1. A starting clutch for a transmission comprising an input shaft having a center hole extending in the axial direction thereof, a shaft member disposed radially outwardly of said input shaft, a clutch case disposed radially outwardly of said shaft member and containing a clutch portion and a clutch piston therein, and a housing containing said clutch case therein, characterized by the provision of a cooling oil path defined between the center hole of said input shaft and said clutch portion and supplying oil for cooling the frictional surface of said clutch portion, an operating oil path defined between said input shaft and said shaft member and between said clutch case and said clutch piston and supplying oil for operating said clutch portion, and a drain oil path defined between said housing and said clutch case and between said shaft member and said housing and discharging the cooling oil having cooled said frictional surface, said cooling oil path and said drain oil path being provided independently of said operating oil path.

2. A starting clutch according to claim 1, characterized in that said starting clutch is provided with a damper device.

3. A starting clutch according to claim 2, characterized in that said starting clutch is used in a power transmitting route wherein an engine, the damper device, the starting clutch and the transmission are connected together in the named order.

4. A starting clutch according to claim 3, characterized in that said transmission is an automatic transmission.

5. A starting clutch according to claim 3, characterized in that said transmission is an infinitely variable transmission.

6. A starting clutch according to claim 2, characterized in that said starting clutch is used in a power transmitting route wherein an engine, the starting clutch, the damper device and the transmission are connected together in the named order.

7. A starting clutch according to claim 6, characterized in that said transmission is an automatic transmission.

8. A starting clutch according to claim 6, characterized in that said transmission is an infinitely variable transmission.

9. A starting clutch according to claim 2, characterized in that said starting clutch is used in a power transmitting route wherein an engine, the damper device, the starting clutch, another damper device and the transmission are connected together in the named order.

10. A starting clutch according to claim 9, characterized in that said transmission is an automatic transmission.

11. A starting clutch according to claim 9, characterized in that said transmission is an infinitely variable transmission.

12. A starting clutch according to claim 1, characterized in that said center hole extends through said input shaft in the axial direction.

13. A starting clutch according to claim 1, characterized in that said center hole is closed at an axial end thereof.

* * * * *